United States Patent [19]

Roder, deceased et al.

[11] 4,449,651
[45] May 22, 1984

[54] TUBULAR METERING OR DOSING MECHANISM FOR DISPENSING LIQUID FROM A CONTAINER IN SUCCESSIVE QUANTUMS OF UNIFORM VOLUME

[75] Inventors: Eberhard Roder, deceased, late of Bad Schwartau, Fed. Rep. of Germany; by Hans-Dieter Borchers, administrator, Lübeck, Fed. Rep. of Germany; Wolfgang Düsing, Zarpen, Fed. Rep. of Germany

[73] Assignee: Gottfried Roder Kunststoffwerk, Lübeck, Fed. Rep. of Germany

[21] Appl. No.: 361,050

[22] Filed: Mar. 23, 1982

[30] Foreign Application Priority Data

Mar. 24, 1981 [DE] Fed. Rep. of Germany ....... 3111503

[51] Int. Cl.³ ............................................. G01F 11/26
[52] U.S. Cl. ..................................... 222/455; 222/442
[58] Field of Search ............... 222/454, 455, 456, 457, 222/424.5, 478, 442

[56] References Cited

U.S. PATENT DOCUMENTS 3,587,943  6/1971  Van Halsel ........................ 222/455
4,061,253 12/1977 Rockefeller ........................ 222/455

FOREIGN PATENT DOCUMENTS 1202672 10/1965 Fed. Rep. of Germany .
2735372 12/1976 Fed. Rep. of Germany ...... 222/455

*Primary Examiner*—Joseph J. Rolla
*Assistant Examiner*—Kenneth Noland
*Attorney, Agent, or Firm*—Cushman, Darby & Cushman

[57] ABSTRACT

The tubular dosing mechanism can be inserted into the dispensing opening of a liquid container. It has a dosing channel the outer end of which is closed, and a discharge channel which is axially separated from the dosing channel and is open at the outer end. Both the channels are connected to a collecting area located further inwards than the inner end of the dosing channel. The dosing channel has axially spaced inlet and outlet orifices connected to the inner area of the liquid container. Of these, the outlet orifice is positioned further axially inwards is the issuing-opening into the dosing channel of a channel which extends through the base wall of the collecting area. Modifications are shown especially for use where the liquid is more viscous than water or the liquid container has an easily deformable sidewall.

14 Claims, 4 Drawing Figures

TUBULAR METERING OR DOSING MECHANISM FOR DISPENSING LIQUID FROM A CONTAINER IN SUCCESSIVE QUANTUMS OF UNIFORM VOLUME

BACKGROUND OF THE INVENTION

1. Field of the Invention

The present invention relates to apparatus for dispensing liquid from a container in successive quantums of equal quantity. In a broad sense, a quantum of a standard quantity of a given liquid can be considered to be a "dose" of that liquid, and therefore the apparatus of the invention may fairly be stated to be a dosing mechanism for successively dispensing liquid quantities of uniform volume.

2. Description of the Prior Art

In a known dosing mechanism of this type, shown in West German Patent 1,202,672, the two orifices connecting the dosing channels with the inner area of the liquid container are positioned in the side wall of the dosing mechanism. One orifice follows directly onto the partition closing the outer end of the dosing channel and the other orifice is at a corresponding axial spacing from the first orifice, so that the two orifices are on a straight line running parallel to the longitudinal axis of the dosing mechanism.

If the liquid container closed by the known dosing mechanism were turned upside down, liquid would flow out of the inner area of the container through the axially furthest outwardly located orifice in the dosing channel wall and into the said channel until the liquid level therein had risen to such an extent that it closed the second orifice, with the liquid container still turned upside down. In this condition, no further air could flow into the inner area of the liquid container and the liquid volume to be dispensed was reached.

However, even after the liquid had closed the second orifice, further liquid could flow from the inner area of the liquid container into the dosing channel, this being the so-called free liquid, this being the quantity of liquid which would flow out of the liquid container on opening the latter, but which would prevent air from entering the inner area of the container. The quantity of this free liquid is dependent inter alia on the specific gravity of the liquid, the height of the column of liquid and the quantity of air in the liquid container, which, due to the escape of the free liquid would then be under a partial vacuum. As a function of the liquid container filling level, the free liquid quantity would vary and could not flow out of the dosing channel, so that in actual fact only half the theoretically possible quantity of free liquid would enter the dosing channel and consequently the other half would be held back in the inner area of the liquid container.

The free liquid which escaped into the dosing channel over and beyond the desired volume in the known dosing mechanism lead to there being a partial vacuum in the inner area of the liquid container. If the liquid container were then tilted back into its normal position, due to the said vacuum in the liquid container during this process, the free liquid which had entered the dosing channel would be sucked back through the said orifice in the dosing channel wall into the inner area of the container, whereas the liquid volume defined by the spacing of the two orifices in the dosing channel wall would enter the collecting area between the end of the partition and the base of the dosing mechanism. By tilting the liquid container, the liquid could then be dispensed through the discharge channel, and, in the case of appropriate tilting, simultaneously a new volume of liquid of the desired size would enter the dosing channel.

The known dosing mechanism has the disadvantage of having a relatively high degree of imprecision in fixing the liquid volume to be dispensed, because the liquid level in the dosing channel can vary as a result of the fact that for filling the dosing channel, the user may bring the liquid container into different slope positions, the precise desired volume being obtained only if the liquid container is turned upside down in such a way that the longitudinal axis of the dosing channel is perpendicular. However, if this axis is varied from the perpendicular, the volume of the corresponding dose of liquid is either larger or smaller than desired, because although the liquid closes the two orifices in the dosing channel wall, the liquid level is inclined with respect to the longitudinal axis in accordance with the divergence of the longitudinal axis of the dosing channel from the perpendicular. In other words, the divergence of the liquid level from a plane perpendicular to the longitudinal axis of the dosing channel caused by the slope, leads to a difference between the actual liquid volume and that which should be dispensed.

SUMMARY OF THE INVENTION

The present invention provides an improvement of the known dosing mechanism, by providing means which ensure that the mechanism will still accurately dispense the predetermined volume of liquid per use, even when the user fails to bring the liquid container to a precisely perpendicularly inverted condition during the preliminary stage in which the dosing channel is being filled with liquid. The objective is met by constructing the dosing mechanism in such a way that the orifice furthest from the outer end is formed by an issuing opening of a channel extending through the base wall into the dosing channel, the issuing opening preferably being coaxial to the longitudinal axis of the dosing channel.

Due to the fact that the opening in the dosing channel which, as a result of its position determines the size of the volume to be dispensed, is now located in the centre and preferably on the longitudinal axis of the dosing channel and not on its side wall, if the longitudinal axis of the dosing channel differs from the perpendicular during its filling, as in the known dosing mechanism, there will still be a liquid level differing from the vertical plane to the longitudinal axis of the dosing channel, said liquid level will be below this on one side of the issuing opening and above it on the other, i.e. compensation will take place between the too-low and the too-high filling levels with respect to said opening. This will in particular be the case if the opening is positioned coaxial to the longitudinal axis of the dosing channel, the latter having e.g. a circular cross-section. In this way, the dosing mechanism according to the invention prevents in a simple manner the unavoidable divergencies from the predetermined liquid volume occurring in the known dosing mechanism.

In order to bring about a very simple construction of the dosing mechanism, the channel wall can be constructed in one piece with the base wall.

The issuing opening of the channel should be as small as possible for a liquid of a given viscosity, so that on transferring liquids from the dosing channel into the collecting area, although the so-called free liquid is sucked back into the inner area of the liquid container, no other liquid enters the latter and consequently there is only a very small variation compared with the size of the liquid volume to be dispensed on sloping with respect to the perpendicular. The channel preferably tapers towards the issuing opening, so that when produced by injection moulding, simple removal from the mould is possible.

It has been found that in the case of easily deformable container walls, such as e.g. in plastic bottles and/or on pouring out a liquid with a viscosity higher than that of water, the dosing mechanism according to the invention does not always reliably function or requires a relatively long time for filling the dosing channel to the desired level.

To obviate these difficulties, the channel intake port facing the issuing opening can have a diameter which is one-half to one-fifth and preferably one-third to one-fourth of the diameter of the channel area following onto the intake port.

To ensure that in the case of such constructions, the air bubbles in the vicinity of the central opening are easily detached on filling the dosing channels, the surface of the wall area having the intake port and located outside the channel can be located in the same plane as the surface of the base wall remote from the issuing opening or can have a larger spacing from the issuing opening than said base wall surface.

To prevent liquid flowback when the liquid is poured from the collecting area into the dosing channel, which would otherwise mean that all the portioned liquid was not dispensed from the bottle, the inner end of the wall surrounding the dosing channel can be drawn in towards the latter, i.e. the connecting opening between the dosing channel and the collecting area can have a reduced opening cross-section compared with the cross-section of these two areas.

If it is necessary to apportion a liquid, the viscosity of which is higher than that of water, it can be advantageous between the issuing opening and the inner areas of the wall surrounding the dosing channel to provide venting apertures in the latter. On filling the collecting area from the dosing channel, the air can then pass through these venting apertures, whereas the dimensions of the annulus between the inner end of the wall surrounding the dosing chamber and the channel wall are not adequate for the passage thereof.

To ensure that the liquid in the inner area of the container can still pass without difficulty into the dosing channel when there is only a relatively small amount of liquid in the container, a plurality of orifices can be distributed around the dosing channel circumference in the vicinity of its outer end.

The principles of the invention will be further discussed with reference to the drawings wherein preferred embodiments are shown. The specifics illustrated in the drawings are intended to exemplify, rather than limit, aspects of the invention as defined in the claims.

DETAILED DESCRIPTION

Figure 1:
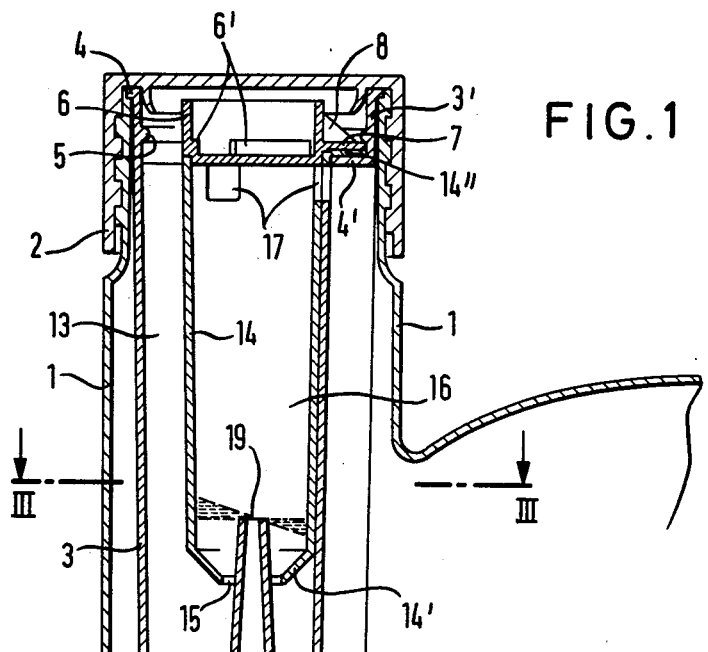
FIG. 1 is a fragmentary longitudinal cross-sectional view of a bottle, having a dosing mechanism according to the principles of the present invention mounted in the tubular outlet opening neck thereof, this dosing mechanism also being shown in longitudinal cross-section.
Figure 3:
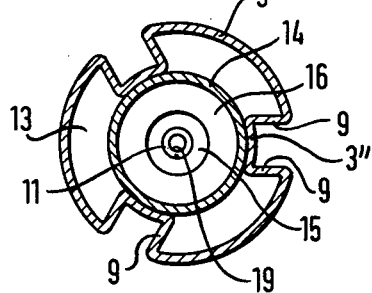
FIG. 3 is a transverse cross-sectional view taken on line 3—3 of FIG. 1.
Figure 2:
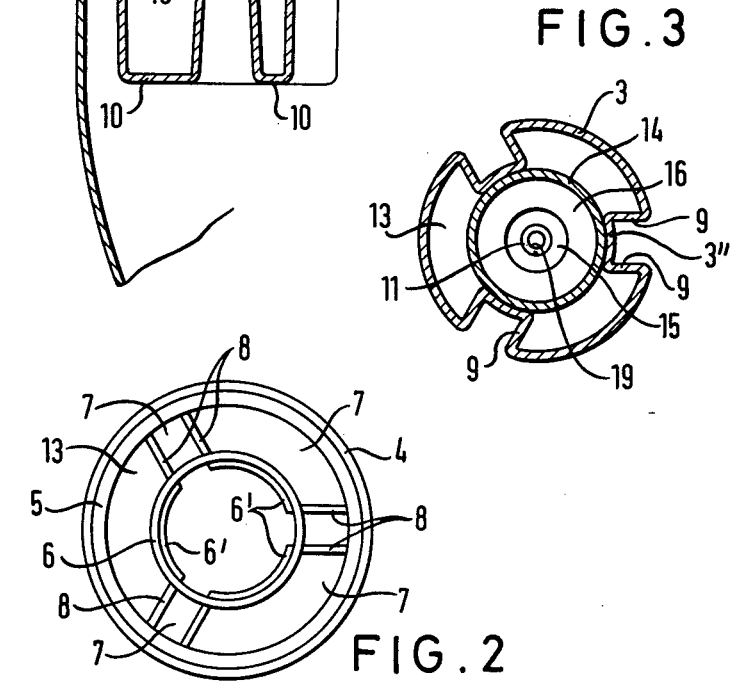
FIG. 2 is an outlet end elevational view of the dosing mechanism of FIG. 1.

Referring first to FIGS. 1-3, the dosing mechanism is shown having a tubular outer body 3, which is forced into the neck of a bottle 1, so that the outer end area 3' of outer body 3 sealingly engages on the inner wall of the neck while an outwardly directed annular shoulder 4, which follows onto this end area, prevents the dosing mechanism from being pressed too far into bottle 1. In FIG. 1, bottle 1 is closed with a screw cap, which is removed for using the dosing mechanism.

A tubular inner body 14 having a circular cross-section is inserted in outer body 3. Inner body 14 has an outwardly directed annular shoulder 14", which is only interrupted in the vicinity of the subsequently-described discharge channel 13. Annular shoulder 14" rests on an inwardly directed annular shoulder 4' of outer body 3, which is only interrupted in the vicinity of the subsequently-described dosing channel 13. As a result, the axial position of inner body 14 relative to outer body 3 is defined. Inner body 14 is radially secured by contact with outer body 3, the circumferential wall of which is displaced radially inwards between the radially directed transition areas 9 and forms engagement areas 3" (FIG. 3), which engage with the outer face of inner body 14 and secure the latter in its coaxial position with respect to outer body 3.

At the inner end, the circumferential wall of outer body 3 passes into a base wall 10, from where a frustum-shaped wall portion 11 extends coaxially to the longitudinal axis of outer body 3 and inner body 14 in the direction of the bottle opening or the outer end of the dosing mechanism and terminates in the interior of inner body 14. In its interior, wall portion 11 forms a channel 18 having its end located in inner body 14, and issuing opening 19 and connects the inner area of bottle 1 to the inner area of inner body 14. The inner end area 14' of inner body 14 has a frustum-shaped configuration, so that an annulus 15 surrounding wall portion 11 is formed at the inner end of inner body 14.

As can be gathered from FIGS. 1 and 2, a sealing plug 6 is inserted in the outer end of inner body 14. Plug 6 rests by means of an outwardly directed annular shoulder 7, which is only interrupted in the vicinity of the subsequently-described discharge channel 13 on annular rib 14" and behind an inwardly directed annular rib 5 of the outer end area 3' of outer body 3 and is in this way held in position. Plug 6 is so constructed by means of radially directed reinforcing ribs 8 and inner-peripherally directed reinforcing area 6' that it does not deform and instead reliably seals the complete dosing mechanism, with the exception of the subsequently-described dosing channel 13.

Aligned orifices 17, which connect the inner area of bottle 1 and the interior of inner body 14, are provided in the walls of outer body 3 and inner body 14 adjacent to plug 6. Three orifices 17 are uniformly distributed about the circumference and are circumferentially located at the same point as engagement areas 3" (FIG. 3).

The inner area of inner body 14 forms a dosing channel 16 and if, with cap 2 unscrewed, bottle 1 is inverted for filling the dosing channel, liquid flows through the orifices 17 of dosing channel 16 into the latter until the liquid level reaches the issuing opening 19 positioned coaxially with respect to channel 16 and closes said opening 19. When opening 19 is closed, no further air can enter the inner area of bottle 1 and only the free liquid flows through orifices 17 into dosing channel 16 and raises the liquid level to such an extent that it is located in an area between opening 19 and annular orifice 15. The volume of this area must obviously be selected in such a way that it receives this free liquid volume. It is in fact half the quantity of free liquid which would theoretically escape if that liquid could flow out without impediment.

After filling dosing channel 16, bottle 1 is again turned back into the position shown in FIG. 1 and the liquid flows from dosing channel 16 flows through annulus 15 into collecting area 12. In fact, the volume of liquid which flows into this collecting area is that which has collected between the inner face of plug 6 or the outer end of orifices 17 and issuing opening 19. However, the quantity of free liquid located between opening 19 and annulus 15 is sucked back into the inner area of bottle 1 through opening 19, as a result of the vacuum in said inner area. Thus, the liquid volume in collecting area 12 reproducibly determined in this way can then be dispensed through the discharge channel 13, which is open to the outside, as a result of a repetition of tilting of bottle 1. As can in particular be understood from FIG. 3, channel 13 is bounded by the wall of inner body 14, a portion of the circumferential wall of outer body 3 and the transition areas 9 following onto the same. On this repetition of tilting the bottle, dosing channel 16 is once again filled through orifices 17, so that a predetermined liquid volume is again brought into the dosing channel during the pouring-out process.

As a result of the central position of issuing opening 19 with respect to dosing channel 16, when the longitudinal axis of channel 16 differs from the perpendicular during the filling of this channel, there is no significant variation between the received volume and the predetermined volume. As can be understood from FIG. 1, the then-occurring liquid level, indicated by the dotted line differs from the liquid level indicated by the dot-dash line in the case of a perpendicular positioning of the dosing channel 16 in such a way that there is more liquid on one side and less on the other, so that the variations on both sides compensate one another. The smaller the issuing opening 19, the more accurate will be this compensation, because then the liquid level indicated by the dotted line, and which closes the complete opening 19, will be at a very limited distance from the center of said opening 19.

It is also pointed out that the distribution of orifices 17 around the circumference of outer body 3 and inner body 14 still ensures reliable dosing if there is only a relatively small amount of liquid in the bottle. In addition, this distribution of the orifices 17 also makes it unnecessary to tilt the bottle along a predetermined plane, as would be the case if only a single orifice 17 was provided.

As is shown, the dosing mechanism comprises merely three parts, i.e. outer body 3, inner body 14 and plug 16, which can be very easily injection molded from plastic material, e.g. polypropylene and assembly merely involves pressing them together and then introducing the resulting assembly into the bottle.

Figure 4:
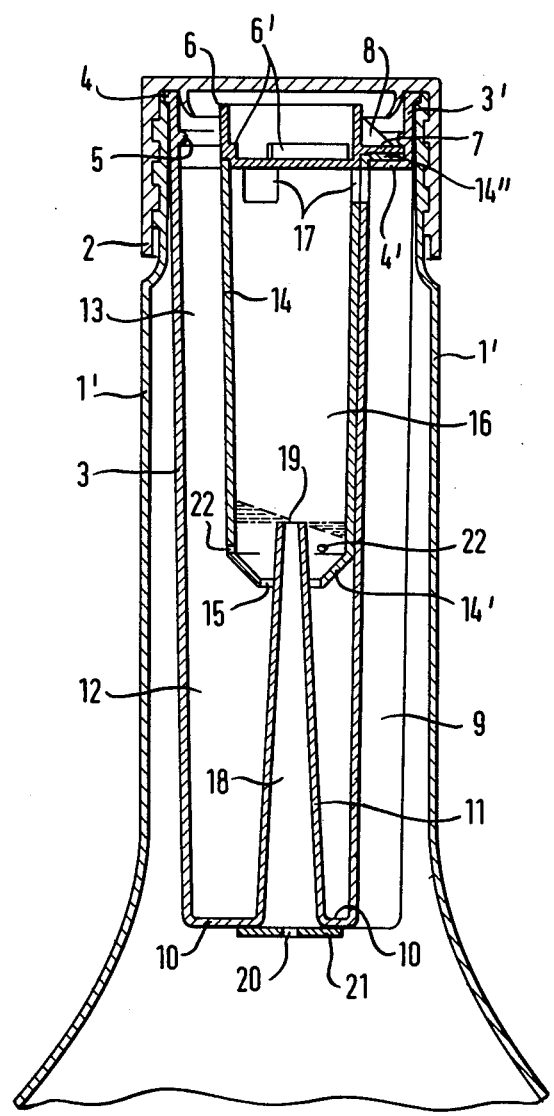
FIG. 4 is a fragmentary longitudinal sectional view similar to FIG. 1, but showing a modified form of the dosing mechanism.

The dosing mechanism of FIG. 4 corresponds to that of FIGS. 1 to 3 and like parts are therefore given the same reference numerals. This dosing mechanism is inserted in a bottle 1' with an elongated neck, e.g. a plastic bottle with relatively easily deformable walls.

Unlike in the case of the dosing mechanism according to FIGS. 1 to 3, in the case of the dosing mechanism of FIG. 4 the lower end of channel 18 in the drawing is closed by a plate 21 fixed to the lower face of wall 10, e.g. by solvent welding or adhesion. In a position coaxial to channel 18, plate 21 has an intake port 20, the diameter of which is approximately one-fourth of the diameter of the channel area following onto the plate, this area starting in the drawing behind the entrance curvature of channel 18.

The constricted intake port 20 of channel 18 speeds-up, in the manner mentioned hereinbefore, the filling of dosing channel 16, when using the dosing mechanism in easily deformable containers and/or when dosing liquids having a viscosity higher than that of water.

As a result of the arrangement of plate 21 in such a way that it projects over the base wall 10, no air bubbles which could prevent filling of the dosing channel can become immobilized and caught between the said plate and the base wall in the vicinity of the intake port 20.

A further difference between the dosing mechanism of FIG. 4 and that of FIGS. 1 to 3 is that small venting ports 22 are provided in wall 14 in the area between issuing opening 19 of channel 18 and annulus 15. These venting ports make it easier for air to enter the dosing channel 16, when a liquid, the viscosity of which is higher than that of water, flows out of channel 16 into collecting area 12. This speeds up the emptying of the dosing channel, whereas if these venting ports were not provided the air might not be able to pass quickly enough through the annulus 15, due to the viscosity of the liquid.

It should now be apparent that the tubular metering or dosing mechanism for dispensing liquid from a container in successive quantums of uniform volume as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. For mounting in the dispenser neck of an invertable container for liquid for dispensing liquid from the container in successive quantums of substantially uniform volume upon successive inversions of the container,
   a tubular dosing mechanism, comprising:
   external wall means having outer peripheral surface means constructed and arranged to circumferentially sealingly engage the dispenser neck when the tubular dosing mechanism is introduced into the dispenser neck;
   first wall means defining a discharge channel having an axial extent, being outwardly open, relative to the dispenser neck into which the tubular dosing mechanism is to be introduced, and having an opposite, inner end closed by base wall means;

second wall means defining a dosing channel extending axially internally of said first wall means and including means closing the outer end thereof relative to the dispenser neck into which the tubular dosing mechanism is to be introduced;

said second wall means providing a partition between said discharge channel and said dosing channel, said partition terminating axially outwardly of said base wall means, so that between said base wall means of the discharge channel-defining first wall means and where said partition terminates a collecting region is provided, said collecting region connecting with both the dosing channel and the discharge channel, and having a volume at least as large as said uniform volume;

means defining a liquid inlet opening into said tubular dosing mechanism and means defining a liquid outlet opening from said tubular dosing mechanism, both said openings being communicated to externally of the tubular dosing mechanism for communication internally of the container for liquid when the tubular dosing mechanism is introduced and sealed in the dispenser neck of such container;

the axial spacing between said inlet and outlet openings being such as to cause there to be admitted from the container to the tubular dosing mechanism upon inversion of the container when the tubular dosing mechanism is introduced and sealed in the dispenser neck of such container an amount of liquid corresponding to said uniform volume;

the axial spacing between said outlet opening and where said partition terminates providing a storage region having a volume that is as large as half that of the maximum free liquid which occurs upon an inversion of the container when the tubular dosing mechanism is introduced and sealed in the dispenser neck of such container;

said outlet opening being located axially inwardly of said inlet opening;

wall means defining an axially extending tubular channel opening externally through said base wall means at an inner end and having said outlet opening defined at an outer end thereof, said outlet opening being located within said dosing channel; and an orifice plate mounted in place covering said inner end of said tubular channel, said orifice plate having an orifice having a diameter which is one-half to one-fifth the diameter of said inner end of said tubular channel axially outwardly adjacent to said orifice plate.

2. The tubular dosing mechanism of claim 1, wherein:
said wall means defining said axially extending tubular channel is integrally formed with said base wall means.

3. The tubular dosing mechanism of claim 1, wherein:
said second wall means defining said dosing channel is tubular so as to have a longitudinal axis, and said outlet opening is located on said longitudinal axis.

4. The tubular dosing mechanism of claim 1, wherein:
said wall means defining said axially extending tubular channel is so shaped that said tubular channel tapers from said base wall means towards said outlet opening.

5. The tubular dosing mechanism of claim 1, wherein:
said orifice has a diameter which is one-third to one-fourth the diameter of said inner end of said tubular channel axially outwardly adjacent to said orifice plate.

6. The tubular dosing mechanism of claim 1, further comprising:
an orifice plate mounted in place covering said inner end of said tubular channel, said orifice plate having an orifice having a diameter which is one-half to one-fifth the diameter of said inner end of said tubular channel axially outwardly adjacent to said orifice plate; and
said orifice has a diameter which is one-third to one-fourth the diameter of said inner end of said tubular channel axially outwardly adjacent to said orifice plate.

7. The tubular dosing mechanism of claim 1, wherein:
said orifice is located axially at least as far from said outlet opening inlet opening is spaced axially from said outlet opening.

8. The tubular dosing mechanism of claim 1, further comprising:
an orifice plate mounted in place covering said inner end of said tubular channel, said orifice plate having an orifice having a diameter which is one-half to one-fifth the diameter of said inner end of said tubular channel axially outwardly adjacent to said orifice plate.

9. The tubular dosing mechanism of claim 8, wherein:
said orifice is located axially at least as far from said outlet opening inlet opening is spaced axially from said outlet opening.

10. The tubular dosing mechanism of any one of claims 2, 3, 4, 6, 8 or 9, further including:
said partition, where said partition terminates, being provided with a radially inwardly projecting annular wall having an inner edge that is spaced radially outwardly of said wall means defining said tubular channel thereby providing an annular gap.

11. The tubular dosing mechanism of claim 1, further including:
said partition, where said partition terminates, being provided with a radially inwardly projecting annular wall having an inner edge that is spaced radially outwardly of said wall means defining said tubular channel thereby providing an annular gap.

12. The tubular dosing mechanism of any one of claims 2, 3, 4, 6, 8, 9 or 11, further including:
means defining at least one venting port through said partition, said at least one venting port being disposed axially between where said partition terminates and said outlet opening.

13. The tubular dosing mechanism of claim 1, further including:
means defining at least one venting port through said partition, said at least one venting port being disposed axially between where said partition terminates and said outlet opening.

14. The tubular dosing mechanism of any one of claims 1, 2, 3, 4, 6, 8, 9, 11 or 13, wherein:
said inlet opening is constituted by means defining a plurality of orifices distributed about the circumference of said dosing channel in the vicinity of the axially outer extent of said dosing channel.

* * * * *